United States Patent [19]

Danforth et al.

[11] Patent Number: 4,820,578

[45] Date of Patent: Apr. 11, 1989

[54] POLYKETONE ROOFING MEMBRANES

[75] Inventors: Richard L. Danforth, Missouri City; Dennis W. Gilmore, Katy, both of Tex.

[73] Assignee: Shell Oil Company, Houston, Tex.

[21] Appl. No.: 187,191

[22] Filed: Apr. 28, 1988

[51] Int. Cl.$^4$ ............................................. C08G 67/02
[52] U.S. Cl. ................................. 428/291; 427/371; 428/290; 428/489; 524/59; 528/392
[58] Field of Search ............... 427/371; 428/290, 291, 428/489; 524/59; 528/392

[56]  References Cited

U.S. PATENT DOCUMENTS

| | | | |
|---|---|---|---|
| 2,357,392 | 9/1944 | Francis | 18/47.5 |
| 2,483,404 | 10/1949 | Francis | 154/90 |
| 2,483,405 | 10/1949 | Francis | 154/54 |
| 2,483,406 | 10/1949 | Francis | 154/29 |
| 2,495,286 | 1/1950 | Brubaker | 260/63 |
| 2,810,426 | 10/1957 | Till et al. | 154/27 |
| 3,595,245 | 7/1971 | Buntim et al. | 131/269 |
| 3,689,342 | 9/1972 | Vogt et al. | 156/167 |
| 3,694,412 | 9/1972 | Nozaki | 260/63 |
| 4,368,228 | 1/1983 | Gorgati | 428/110 |
| 4,420,524 | 12/1983 | Gorgati | 428/110 |

FOREIGN PATENT DOCUMENTS

| | | |
|---|---|---|
| 117000 | 8/1984 | European Pat. Off. . |
| 121965 | 10/1984 | European Pat. Off. . |
| 181014 | 5/1986 | European Pat. Off. . |
| 1081304 | 8/1967 | United Kingdom . |
| 2126611 | 5/1984 | United Kingdom . |

*Primary Examiner*—Harold D. Anderson
*Assistant Examiner*—T. Mason
*Attorney, Agent, or Firm*—Wendy K. B. Buskop

[57]  ABSTRACT

A weatherproof coating for roofs or decks is formed when an adhering material is used in conjunction with a nonwoven mat formed from a linear alternating polymer of carbon monoxide and at least one ethylenically unsaturated hydrocarbon.

10 Claims, No Drawings

POLYKETONE ROOFING MEMBRANES

BACKGROUND OF THE INVENTION

Roofs and decks, for example those formed from timber, metal (steel) or concrete are usually provided with a weatherproof or water resistant coating. Weatherproof coatings are known which comprise one or more layers of bitumenized felt, nailed or adhered to the surface of the roof. Such coatings are relatively easy to apply with the felt being supplied in rolls of about 1 meter wide which are simply unrolled across the roof and secured with nails and/or bitumen adhesive applied by brushing. However, unless great care is taken to ensure that the felt, as it is unrolled is firmly bonded to the roof or deck or to a previous layer of felt, especially at the seams, points of potential weakness may occur and the waterproof coating may fail. These roofing or deck coating materials are also known as roofing membranes.

Roofing membranes containing vinyl chloride polymers in conjunction with external plasticizers are known. However, such products have a number of shortcomings, the plasticizer can migrate from the membrane causing embrittlement and possible shrinkage with the passing of time. Also, the presence of the external plasticizer can cause incompatibility between the membrane or nonwoven roofing material and adjacent roofing material such as film insulation, coal tar bonding substances and the like. Incompatibility will manifest itself by the lack of secure bonding between the nonwoven material and the adjacent materials therefore allowing the penetration of moisture into the interior of the building or deck. Accordingly, a new nonwoven roofing or deck material has been developed from melt spun fibers which comprises a linear alternating polyketone polymer of carbon monoxide and at least one ethylenically unsaturated hydrocarbon which has been embedded and/or covered in an adhering material, such as asphalt.

The general class of polymers of carbon monoxide and/or one or more ethylenically unsaturated hydrocarbons, known as polyketones have been known for some years. Brubaker U.S. Pat. No. 2,495,286 produced such polymers of relatively low carbon monoxide content in the presence of free-radical initiators such as benzoyl peroxide. British Pat. No. 1,081,304 produced such polymers of higher carbon monoxide content in the presence of alkylphosphine complexes of palladium as catalyst. Nozaki extended the process to produce linear alternating polymers in the presence of arylphosphine complexes of palladium. See for example, U.S. Pat. No. 3,694,412.

More recently the class of linear alternating polymers of carbon monoxide and at least one ethylenically unsaturated hydrocarbon has become of greater interest in part because of the availability of the polymers. These polymers often referred to as polyketone or polyketone polymers have been shown to be of the repeating formula —CO(A)— where A is the moiety of an ethylenically unsaturated hydrocarbon polymerized through the ethylenic unsaturation. For example, when the ethylenically unsaturated hydrocarbon is ethylene, the polymer will be represented by the repeating formula —CO—($CH_2$—$CH_2$)—. The general process for the more recent production of such polymers is illustrated by a number of published European Patent Applications including 121,965 and 181,014. These processes typically involve a catalyst composition formed from a compound of the Group VIII metals, palladium, cobalt or nickel, the anion of a strong non-hydrohalogenic acid having a pKa below 6 and a bidentate ligand of phosphorus, arsenic or antimony.

The resulting polyketone polymers are relatively high molecular weight thermoplastics having utility in the roofing industry and in the construction industry. The novel polyketone polymers, when formed into a mat and adhered to a roof or deck with an adhering material, such as a bitumen composition, result in a waterproof roofing compound capable of strength, some flame resistance as well as abrasion resistance.

SUMMARY OF THE INVENTION

A weatherproof coating for roofs or decks is formed when an adhering material is used in conjunction with a nonwoven mat formed from a linear alternating polymer of carbon monoxide and at least one ethylenically unsaturated hydrocarbon.

A method for forming a weatherproof coating on a roof or deck comprising the steps of:

coating the roof or deck with a bituminous liquid or paste, and disposing in the liquid or paste, a nonwoven mat comprising a linear alternating polymer of carbon monoxide and at least one ethylenically unsaturated hydrocarbon.

A method for forming a waterproof coating on a roof or deck comprising:

saturating a nonwoven mat comprising a linear alternating polymer of carbon monoxide and at least one ethylenically unsaturated hydrocarbon, with an adhering material and disposing the saturated mat on the roof or deck.

DETAILED DESCRIPTION OF THE INVENTION

The polyketone polymers which are employed as the nonwoven mat are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-octene, and 1-dodecene, or are aryl aliphatic containing an aryl substituent on an otherwise aliphatic moiety, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

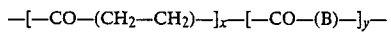

where B is the moiety obtained by polymerization of the second hydrocarbon through the ethylenic unsaturation. The —[—CO—(CH$_2$—CH$_2$—)—] units and the —CO—(B)— units are found randomly throughout the polymer chain and the ratio of y:x is no more than about 0.5. In the modification of the invention where copolymers of carbon monoxide and ethylene are employed as a blend component and there is no second hydrocarbon in the polymer chain, the polymer is represented by the above formula wherein y=0. If y is other than 0, i.e., terpolymers are employed, ratios of y:x should be no more than 0.5 and from about 0.01 to about 0.2 are preferred. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of high molecular weight from about 1,000 to about 500,000, especially those of molecular weight over 10,000. The physical properties of the polyketone polymers will depend in part on the molecular weight of the polymer, whether the polymer is a copolymer or a terpolymer and the proportion of the second hydrocarbon present in the case of a terpolymer.

Typical melting points are from about 175° C. to about 300° C., more typically from about 180° C. to about 285° C. Polyketone polymers usable herein may have melting points of between about 190°-230° C. and polymers with melting points ranging from about 230° C. to about 270° C. may be usable herein.

Useful polyketones for the novel nonwoven mat have limiting viscosity numbers (LVN) as measured by the method wherein the polymer is dissolved in metacresol at 60° C.; using a standard capillary viscosity measuring device, such as a Cannon-Ubbelohde viscometer in the range of 0.5 to 10 LVN and more preferably 0.8 to 4 LVN and even more preferably 0.8 to 2.5 LVN.

A method of producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)-phosphino]propane. Such a process for polyketone production is illustrated by copending U.S. application Ser. No. 930,468, filed Nov. 14, 1986.

Polymerization is conducted in a gas phase in either the absence of diluent or the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues.

The material used to prepare the mats may be additionally blended with conventional additives, such as antioxidants, stabilizers, mold release agents, colorants, fire-resistant materials and other substances which are added to increase the processability of the polyketone polymer and modify the properties of the resulting nonwoven mat. Such additives are incorporated into the polymers by conventional methods prior to or together with the subsequent treatment of the polyketone polymer.

The method of producing the polyketone polymer mats is not material so long as a usable nonwoven mat is produced. In one modification the mat be formed by melt spinning the polymer material into fibers and then pressure forming the melt spun fibers into a nonwoven mat.

According to this invention, the nonwoven mat of polyketone then can be disposed first on either another waterproof coating already in place on a roof or deck (such as a cold applied waterproof coating) or alternatively the mat may be directly adhered upon the roof or deck with another type of cold applied adhesives, or torch applied to the roof or deck. Material applied by this method can then be coated with a bitumen composition such as asphalt. Saturated mats of polyketone can be disposed on a roof or deck using cold applied adhesives, hot mopping asphalt or direct torch application. Torch application involves passing hot air over the surface of the membrane such as with a propane torch prior to immediately disposing the saturated mat on the roof or decking. The torch applications work best with the embodiment incorporating saturated mats of polyketone.

At least one of these polyketone nonwoven mats may be used on the surface of the roof or decking. Alternatively, two or more of the polyketone mats may be applied to the roof or decking forming a laminar structure.

The nonwoven mats may be applied to a roof or deck separately or in succession, and then coated with a bituminous liquid. Yet another modification of the invention involves a first adhering material upon the roof, covering it with a nonwoven mat, applying additional adhering material, and disposing a second succeeding novel nonwoven polyketone mat on top of the first. In this way, the whole weatherproof coating is compacted into a unitary mass and adhered to the whole underlying surface of the roof or deck. The entire process can be repeated many times, though it is contemplated that 4 layers would be most effective for roofing applications.

It is conceivable that an additional reinforcing fabric or reinforcing structure may be disposed between two or more of the nonwoven mats to provide additional support to the roofing or deck structure while enhancing flexibility and weather-resistance of the structure.

As known in the art, the bituminous liquids or pastes usable herein may be an emulsion or solution. A cold applied adhesive usable herein may be M-80 available from Karnak Company. After the weatherproof mat is laid, components may evaporate, or be allowed to cool leaving a solid weatherproof coating comprising the nonwoven polyketone mat embedded in the bitumen or other adhesives.

Following normal practice, the weatherproof coating may, if desired, be finished with another a decorative and/or protecting layer of a substance including a coloring pigment, ceramic granules, natural rock, or metal particles, such as reflective particles to provide enhanced protection from solar radiation or other aesthetic benefits.

EXAMPLE 1

A melt spun nonwoven mat with a thickness of 0.03 inches can be formed from polyketone fibers 087/012 which is a linear alternating terpolymer of carbon monoxide, ethylene and propylene produced in the presence of the catalyst composition formed from palladium acetate, the anion of trifluoroacetic acid and 1,3-bis[-di(2-methoxyphenol)phosphino]propane, blended with 200 ppm Ionol, 700 ppm Irganox 245, available from Ciba Geigy and 0.1% by weight zinc oxide to enhance polymer stability, and demonstrating a melting point of 218° C. and a limiting viscosity number of 1.16 when measured in M-cresol at 60°. It should be noted that mats 0.02–0.04 inches thickness are considered as usable herein.

The fibers are formed using a fiber line having a flat 200° C. temperature profile across all heating zones. The fiber line is a melt spun fiber line which uses a 24 L/d extruder which has a one inch (d) diameter and a length of 24 inches (L). The preferred extruder is made by Modern Plastics Machinery and has temperature monitoring in three locations along the extruder. The pressure in the extruder is preferably monitored in two locations in the latter part of the barrel. The extruder feeds a 2.5 cc Kawasaki melt pump with the input pressure feedback controlled by extruder rpm. Alternative melt pumps may be used such as a 1.75 cc Zenith pump. Pressure is monitored in the adaptor which is also temperature controlled and sits between the extruder and the melt pump. Pressure is monitored before and after a screen pak. The pressure used for feedback control of the melt pump is the pressure after the screen pak since the pressure before the screen pak is found to cyclically vary as a function of a final screw speed of the extruder. Output pressure between the melt pump and final screen pak is also monitored. The spinnerette setup is 60 holes, L/d which equal 4, with a hole diameter (d) of 15 mil and a hole length (L) of 60 mils. Usable spinnerettes are available from Nippon Nozzle. The fibers are quenched with air after being extruded. The air temperature is controlled to within ½° C. with the quenched temperature being preferably between about 50° and 95° F. The quench zone is preferably about 6 feet in length and divided into 3 sections, each of which can accept about 10–80% of the total quench air flow. Quenching can be performed with hot air or cold air and if hot air is used the quenching should be performed at temperatures from about 95° F. to about 400° F. For the quenching process, hot or cool air can be blown past the fibers. Alternatively, acquiescent quench with nonmoving air can be performed. The fibers can then be melt blown using conventional fabrication methods, such as those disclosed in the processes of U.S. Pat. Nos. 2,357,392; 2,483,404; 2,483,405; 2,483,406; 2,810,426; 3,595,245; and 3,689,342. Other methods of fiber fabrication are considered usable within the scope of the invention.

The melt blown fibers can then be formed into a nonwoven mat by conventional methods. The nonwoven mat can then be used as a covering, such as for a roof.

A roof can be coated with a adhering material having the following composition and percentage parts by weight: bitumen 40–60, inorganic mineral fillers 1–10, elastomeric polymer Kraton D 1101 0.1–10, available from Shell Chemical Company of Houston, Tex.; and the remainder being a hydrocarbon solvent, toluene. The nonwoven mat can be pressed onto a roof which has been covered with an adhering material. The mat should be wholly impregnated with the adhering material and adhering to the whole surface of the roof. When the adhering material dries, a further coating of adhering material can be applied and a second nonwoven mat of polyketone 087/012 can be disposed in the adhering material and allowed to at least partially dry. A final layer of adhering material can be applied to saturate and coat the second nonwoven mat. The second mat can be compacted against the first nonwoven mat.

In alternative embodiments, the adhering material can be hot bitumen (~160° C.) composed of at least from 85–95 wt% asphalt, such as Shell AR1000, available from Shell Oil Company of Houston, Tex.; and 15–5 wt% Kraton SEBS rubber available from Shell Chemical Company, Houston, Tex. Fillers can be added to this material for use herein.

It is expected that the weatherproof coating should last at least one year under Florida and Arizona weather conditions. Further, it is anticipated that rot-resistance will be improved for the deck or roof through the use of the novel synthetic nonwoven polyketone mats. When an elastomeric adhering material is used, it is expected that improvements in fatigue life of the roofing of deck membrane will result.

What is claimed is:

1. A weatherproof coating for roofs or decks is formed when an adhering material is used in conjunction with a nonwoven mat formed from a linear alternating polymer of carbon monoxide and at least one ethylenically unsaturated hydrocarbon.

2. The weatherproof coating of clalim 1, wherein the adhering material is a bituminous liquid or paste.

3. The weatherproof coating of claim 1, wherein the adhering material is a bituminous liquid or paste incorporating an elastomer.

4. The weatherproof coating of claim 1, wherein said linear alternating polymer is of the formula

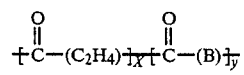

wherein B is the moiety of an ethylenically unsaturated α-olefin of at least 3 carbon atoms polymerized through the ethylenic unsaturation, the ratio of y:x is no more than about 0.5.

5. The weatherproof coating of claim 1, wherein said linear alternating polymer is of the formula

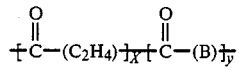

wherein B is the moiety of an ethylenically unsaturated α-olefin of at least 3 carbon atoms polymerized through the ethylenic unsaturation, and wherein group B of said linear alternating polymer is propylene, and the ratio of y:x is from about 0.01 to about 0.2.

6. The weatherproof coating of claim 4, where y is zero.

7. A method for forming a weatherproof coating on a roof or deck comprising the steps of:
   coating the roof or deck with a bituminous liquid or paste, and
   disposing in the liquid or paste, a nonwoven mat comprising a linear alternating polymer of carbon monoxide and at least one ethylenically unsaturated hydrocarbon.

8. The method of claim 7, additionally comprising the step of:
   coating the nonwoven mat with a bituminous liquid or paste.

9. The method of claim 7, wherein the steps are repeated at least 4 times.

10. A method for forming a waterproof coating on a roof or deck comprising:
    saturating a nonwoven mat comprising a linear alternating polymer of carbon monoxide and at least one ethylenically unsaturated hydrocarbon, with an adhering material and
    disposing the saturated mat on the roof or deck.

* * * * *